United States Patent
Esche et al.

(10) Patent No.: US 8,958,478 B2
(45) Date of Patent: Feb. 17, 2015

(54) METHOD AND DEVICE FOR PROCESSING PIXELS CONTAINED IN A VIDEO SEQUENCE

(75) Inventors: Marko Esche, Berlin (DE); Andreas Krutz, Berlin (DE); Alexander Glantz, Berlin (DE); Thomas Sikora, Berlin (DE)

(73) Assignee: Technische Universitaet Berlin, Berlin (DE)

(*) Notice: Subject to any disclaimer, the term of this patent is extended or adjusted under 35 U.S.C. 154(b) by 674 days.

(21) Appl. No.: 12/960,431

(22) Filed: Dec. 3, 2010

(65) Prior Publication Data

US 2012/0140826 A1 Jun. 7, 2012

(51) Int. Cl.
| | |
|---|---|
| H04N 5/14 | (2006.01) |
| H04N 19/82 | (2014.01) |
| H04N 19/117 | (2014.01) |
| H04N 19/137 | (2014.01) |
| H04N 19/139 | (2014.01) |
| H04N 19/176 | (2014.01) |
| H04N 19/182 | (2014.01) |
| H04N 19/189 | (2014.01) |

(52) U.S. Cl.
CPC ....... *H04N 7/26382* (2013.01); *H04N 7/26058* (2013.01); *H04N 7/26132* (2013.01); *H04N 7/26138* (2013.01); *H04N 7/26244* (2013.01); *H04N 7/26255* (2013.01); *H04N 7/26313* (2013.01)
USPC ................................................ 375/240.16

(58) Field of Classification Search
CPC ....... H04N 7/02; H04N 13/02; H04N 7/2605; G09K 9/00
USPC ......... 375/240.12, 240.16; 382/236; 348/143, 348/608
See application file for complete search history.

(56) References Cited

U.S. PATENT DOCUMENTS

| | | | |
|---|---|---|---|
| 6,359,647 B1 * | 3/2002 | Sengupta et al. | 348/154 |
| 6,442,203 B1 | 8/2002 | Demos | |
| 2005/0265452 A1 | 12/2005 | Miao et al. | |

(Continued)

FOREIGN PATENT DOCUMENTS

EP 0 614 312 A2 9/1994

OTHER PUBLICATIONS

Esche, M. et al. "A Novel Inloop Filter for Video-Compression Based on Temporal Pixel Trajectories", Picture Coding Symposium 2010, Dec. 8-10, 2010, pp. 514-517. XP030082042.

(Continued)

*Primary Examiner* — Y Lee
*Assistant Examiner* — Salame Amr
(74) *Attorney, Agent, or Firm* — Foley & Lardner LLP

(57) ABSTRACT

Method and device for processing pixels contained in a video sequence including processing the pixel amplitude of at least one Image pixel contained in a current frame of a video sequence. The method includes the steps of constructing an individual motion trajectory including motion-shifted versions of the image pixel over a plurality of neighboring frames, and processing the pixel amplitude based on the individual motion trajectory. The step of the constructing the individual motion trajectory includes the steps of choosing at least one image pixel of the current frame as a start pixel of the individual motion trajectory, and adding motion-shifted versions of the image pixel of preceding find/or subsequent frames to the individual motion trajectory.

18 Claims, 7 Drawing Sheets
(1 of 7 Drawing Sheet(s) Filed in Color)

(56) References Cited

U.S. PATENT DOCUMENTS

2007/0013776 A1* 1/2007 Venetianer et al. ........... 348/143
2008/0056366 A1 3/2008 Bhaskaran
2008/0080779 A1* 4/2008 Nakanishi .................... 382/236
2010/0177822 A1* 7/2010 Karczewicz et al. .... 375/240.12
2010/0245672 A1* 9/2010 Erdler et al. ................. 348/608

OTHER PUBLICATIONS

Esche, M. et al. "In-Loop filtering using temporal pixel trajectories", Joint Collaborative Team on Video Coding (JCT-VC) of ITU-T SG16 WP3 and ISO/IEC JTC1/SC29/WG11, Oct. 2010, pp. 1-6. XP030007929.

Esche, M. et al. "Temporal Trajectory Filtering for Bi-Directional Predicted Frames", Proceedings of the 18th IEEE International Conference on Image Processing, Sep. 11, 2011, pp. 1669-1672. XP002661731.

International Search Report and Written Opinion in PCT/EP2011/064695 dated Mar. 28, 2012.

Moura, R. "A Spatiotemporal Motion-Vector filter for Object Tracking on Compressed Video", Advanced Video and Signal Bases Surveillance (AVSS), Aug. 29, 2010, pp. 427-434.

P. List et al., "Adaptive deblocking filter," IEEE Transactions on Circuits and Systems for Video Technology (TCSVT), 13(7): 614-619, 2003.

E. Dubois et al., "Noise reduction in image sequences using motion-compensated temporal filtering," IEEE Transactions on Communications, 32(7): 826-831, 1984.

Ohm, Jens-Rainer, "Three-dimensional subband coding with motion compensation," IEEE Transactions on Image Processing, 3(5): 559-571, 1994.

X. Wang et al., "Simplified update step of motion compensated temporal filtering for video coding," in Proceedings of the 24th Picture Coding Symposium, 2006, pp. 826-831.

D.T. Vo et al., "Optimal motion compensated spatio-temporal filter for quality enhancement of H.264/AVC compressed video sequences," in Proceedings of the 16th International Conference on Image Processing (ICIP), 2009, pp. 3173-3176.

A. Glantz et al., "Video coding using global motion temporal filtering," in ICIP, 2009, pp. 1053-1056.

Bjøntegaard, Gisle, "Calculation of average PSNR differences between RD-curves," ITU-T SG16/Q.6 VCEG document VCEG-M33, 2001 (4 pgs).

* cited by examiner

| Sequence | BD-rate | $\Delta_{PSNR}$ | Resolution | frames |
|---|---|---|---|---|
| Allstars | −2.49% | +0.09 dB | 704x576 | 250 |
| Basketball | −2.76% | +0.11 dB | 1024x576 | 300 |
| BBC-Pan-13 | −7.62% | +0.42 dB | 720x576 | 110 |
| Desert | −9.13% | +0.44 dB | 720x400 | 240 |
| Entertainment | −5.86% | +0.25 dB | 720x576 | 250 |
| Stanford | −3.29% | +0.10 dB | 720x480 | 304 |

Fig. 6

| Sequence | BD-rate | $\Delta_{PSNR}$ | Resolution | Frames |
|---|---|---|---|---|
| BQMall | −3.15% | +0.15 dB | 832x480 | 600 |
| BQSquare | −7.73% | +0.29 dB | 416x240 | 600 |
| BQTerrace | −12.46% | +0.31 dB | 1920x1080 | 600 |
| Cactus | −0.12% | 0.00 dB | 1920x1080 | 500 |
| Kimono1 | −2.81% | +0.12 dB | 1920x1080 | 240 |
| ParkJoy | −2.67% | +0.09 dB | 2560x1600 | 250 |
| ParkScene | −7.15% | +0.29 dB | 1920x1080 | 240 |
| PartyScene | −4.73% | +0.19 dB | 832x480 | 500 |
| PeopleOnStreet | −0.28% | +0.01 dB | 2560x1600 | 150 |
| RaceHorses | −1.73% | +0.07 dB | 832x480 | 300 |
| Traffic | −4.11% | +0.16 dB | 2560x1600 | 300 |
| vidyo1 | −1.25% | +0.04 dB | 1280x720 | 600 |
| vidyo3 | −3.98% | +0.16 dB | 1280x720 | 600 |
| vidyo4 | −2.59% | +0.11 dB | 1280x720 | 600 |

Fig. 7

METHOD AND DEVICE FOR PROCESSING PIXELS CONTAINED IN A VIDEO SEQUENCE

The present invention relates to methods and devices for processing pixels contained in a video sequence.

BACKGROUND OF THE INVENTION

An in-loop filter for processing video sequences is described in [1]. This filter provides adaptive de-blocking and has shown to improve both the subjective and the objective quality of a decoded video sequence.

The concept of motion compensated temporal filtering was first introduced in [2]. The notion of a motion trajectory and its applications to video coding were first described in [3], which was extended to a temporal filtering approach in [4]. Approaches with a similar aim have been presented in [5] and [6].

Even though most of the mentioned prior art filters provide quite good results, better performance is still desirable for many of today's video applications.

OBJECTIVE OF THE PRESENT INVENTION

An objective of the present invention is to provide a method for efficiently processing image pixels in order to increase the quality of a video sequence.

A further objective of the present invention is to provide a device for efficiently processing image pixels in order to increase the quality of a video sequence.

BRIEF SUMMARY OF THE INVENTION

An embodiment of the present invention relates to a method for processing the pixel amplitude of at least one image pixel contained in a current frame of a video sequence, said method comprising the steps of constructing an individual motion trajectory comprising motion-shifted versions of the at least one image pixel over a plurality of neighboring frames, and processing the pixel amplitude based on the individual motion trajectory;

wherein said step of constructing said individual motion trajectory comprises the steps of:

choosing the at least one image pixel of the current frame as a start pixel of the individual motion trajectory, and adding motion-shifted versions of the at least one image pixel of preceding and/or subsequent frames to the individual motion trajectory, wherein for each motion-shifted version to be added, it is determined whether a difference value, which indicates the change of the pixel amplitude of the respective motion-shifted version between consecutive frames, is smaller than an amplitude threshold value, which is individually assigned to the current frame or a frame portion of the current frame comprising said at least one image pixel, and wherein said step of adding further motion-shifted versions is stopped if said difference value exceeds said amplitude threshold value.

An advantage of this embodiment of the invention is that—in contrast to prior art methods—the potential of identifying each pixel with a motion of its own is fully exploited.

The step of adding a motion-shifted version to the individual motion trajectory preferably includes:

determining the pixel amplitude of said motion-shifted version;

determining the pixel amplitude of the motion-shifted version in the next preceding and/or subsequent frame;

determining a difference value, which indicates the difference between the pixel amplitude of said motion-shifted version and the pixel amplitude of said motion-shifted version in the next preceding and/or subsequent frame;

comparing said difference value with said amplitude threshold value, if the difference value is smaller than said amplitude threshold value, elongating the individual motion trajectory by adding the motion-shifted version to the individual motion trajectory, and if the difference value exceeds said amplitude threshold value, completing the construction of the individual motion trajectory.

The at least one image pixel and the motion-shifted versions thereof may belong to a pixel block, which comprises a plurality of pixels belonging to the same frame section.

Furthermore, for each motion-shifted version to be added, the number of pixel blocks, which are adjacent to said pixel block and have similar or identical motion vectors, may be determined. The number of pixel blocks may be compared with a block threshold value, and the step of adding further motion-shifted versions to the individual motion trajectory may be stopped if the number of pixel blocks is smaller than said block threshold value.

Motion vectors may be considered to be similar if the difference between the motion vectors' length is smaller than a first predefined threshold value and if the difference between the motion vectors' angles is smaller than a second predefined threshold value. E. g., the first predefined threshold value may be between 5% and 20% of one of the motion vector's length; and the second predefined threshold value may be between 5% and 20% of one of the motion vector's angle.

Furthermore, the following steps may be carried out:
(a) defining an amplitude threshold value range comprising a plurality of amplitude threshold values;
(b) processing the pixel amplitudes of a plurality of pixels contained in the current frame based on a given amplitude threshold value of said amplitude threshold value range, and generating a processed frame;
(c) comparing the processed frame with a reference frame and determining an image difference value;
(d) repeating steps (b) and (c) for each amplitude threshold value of said amplitude threshold value range and determining the respective image difference value;
(e) determining the amplitude threshold value providing the smallest image difference value; and
(f) allocating the determined amplitude threshold value to the current frame.

The amplitude threshold value range preferably ranges to at most 5% of the maximum intensity value that is allowed to be assigned to pixel amplitudes.

Moreover, a bit stream may be generated, the bits of said stream describing the frames of the video sequence and the amplitude threshold value for each of said frames.

The frames of the video sequence may comprise pixel blocks, each pixel block comprising a plurality of pixels belonging to the same frame section. The video sequence may comprise a flag for each block, said flag indicating whether or not the amplitude threshold value of the frame is allocated to the pixels of the respective pixel block. For pixels of blocks, to which no amplitude threshold value is allocated, the construction of trajectories may be skipped.

The method may further comprise the steps of:
(a) defining an amplitude threshold value range comprising a plurality of amplitude threshold values, and a block threshold value range comprising a plurality of block threshold values;
(b) processing the pixel amplitudes of a plurality of pixels contained in the current frame based on a given amplitude threshold value of said amplitude threshold value range and a given block threshold value of said block threshold value range, and generating a processed frame;
(c) comparing the processed frame with a reference frame and determining an image difference value;
(d) repeating steps (b) and (c) for each amplitude threshold value of said threshold value range and each block threshold value of said block threshold value range, and determining the respective image difference value;
(e) determining the combination of amplitude threshold value and block threshold value providing the smallest image difference value; and
(f) allocating the determined amplitude threshold value and the determined block threshold value to the current frame.

The amplitude threshold value range preferably ranges to at most 5% of the maximum intensity value that is allowed to be assigned to pixel amplitudes; and said block threshold value range preferably ranges to at most 50% of the maximal number of blocks adjacent to a given block.

A bit stream may be generated, the bits of said stream describing the frames of the video sequence, the amplitude threshold value for each of said frames, and the block threshold value for each of said frames.

The frames of the video sequence may comprise pixel blocks, each of which comprises a plurality of pixels belonging to the same frame section. The video sequence may comprise a flag for each block, said flag indicating whether or not the amplitude threshold value of the frame and the block threshold value of the frame are allocated to the pixels of the respective pixel block. For pixels of blocks, to which no amplitude threshold value and no block threshold value is allocated, the construction of trajectories may be skipped.

The step of processing the pixel amplitude based on the individual motion trajectory may comprise the step of combining the pixel amplitudes of the motion-shifted versions of said image pixel along the individual motion trajectory using a weighting function, to form a processed pixel amplitude of said image pixel.

The frames of the video sequence may be filtered (e.g. in-loop filtered) and/or predicted by incorporating said processed pixel amplitude of said image pixel into the video sequence.

Further video sequences having spatially adjacent frames that comprise image pixels corresponding to those of said video sequences, may also be taken into account to form said processed pixel amplitude of said image pixel.

A further embodiment of the present invention relates to a device capable of carrying out the method as described above. The device may comprise a processor and a memory storing an executable computer program capable of performing the methods steps as described above.

The device may be or is a part of a filter (e.g. in-loop-filter), a decoder and/or an encoder.

BRIEF DESCRIPTION OF THE DRAWINGS

The patent or application file contains at least one drawing executed in color. Copies of this patent or patent application publication with color drawing(s) will be provided by the Office upon request and payment of necessary fee.

In order that the manner in which the above-recited and other advantages of the invention are obtained will be readily understood, a more particular description of the invention briefly described above will be rendered by reference to specific embodiments thereof which are illustrated in the appended figures and tables. Understanding that these figures and tables depict only typical embodiments of the invention and are therefore not to be considered to be limiting of its scope, the invention will be described and explained with additional specificity and detail by the use of the accompanying drawings in which

FIG. 6 shows an exemplary embodiment of a first table (Table 1) showing Bjøntegaard-Delta rate (BD-rate) and average PSNR gain for all TV sequences (QP from 20 to 40); and FIG. 7 shows an exemplary embodiment of a second table (Table 2) showing BD-rate and average PSNR gain for all MPEG sequences (QP from 20 to 40).

DETAILED DESCRIPTION OF THE PREFERRED EMBODIMENTS

Figure 1:
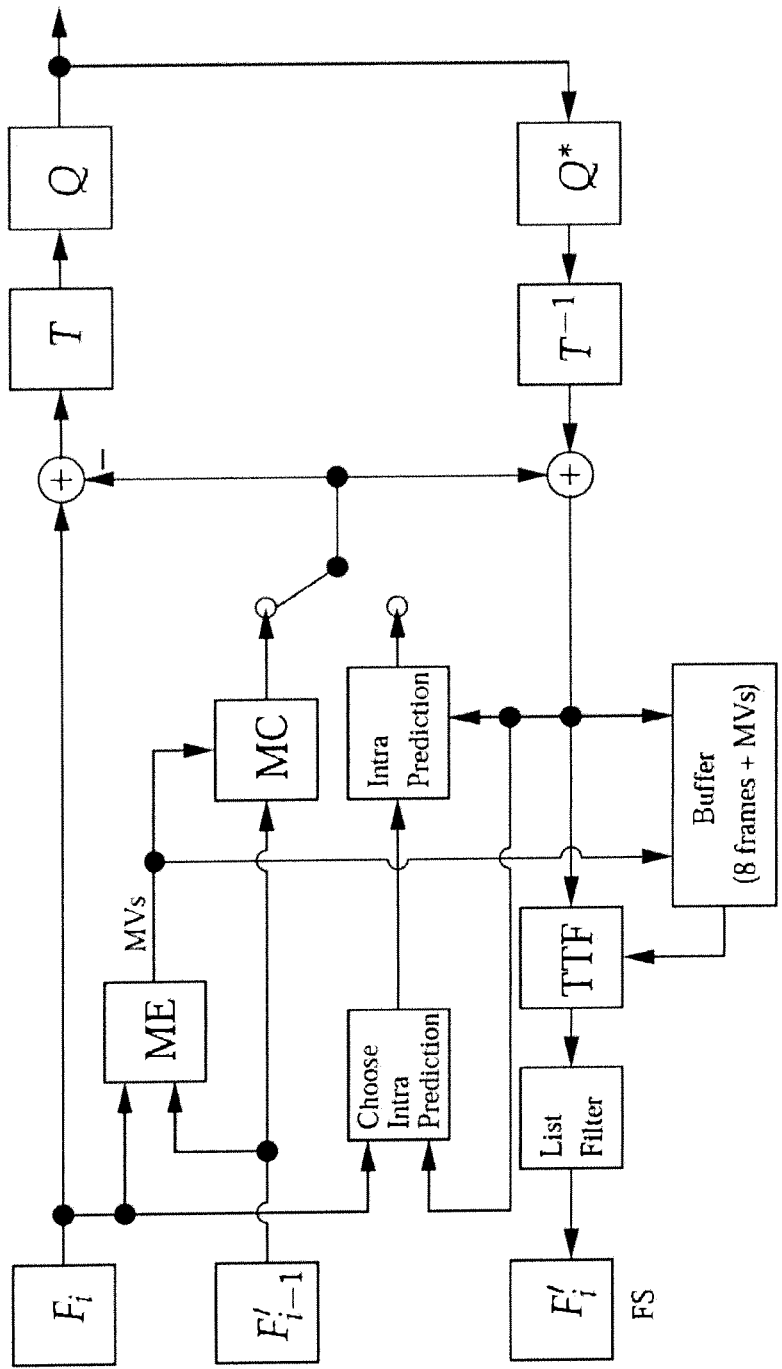
FIG. 1 shows an exemplary embodiment of a H.264/AVC encoder with integrated temporal trajectory filter (TTF) filter in front of the inloop deblocking filter, wherein $F_i$ and $F'_i$ are the original frame and the respective locally reconstructed frame.

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

In an exemplary fashion, an inloop filter based on temporal pixel trajectories is described. A pixel trajectory can be defined as 2D-locations through which a certain image point moves from frame to frame. It will be shown that the temporal trajectory filter (TTF) performs well when integrated into the H.264/AVC baseline profile, providing significant bit rate savings for a wide range of sequences.

In block-based motion compensated video codecs such as the H.264/AVC, there exist two main blocks that introduce noise at the encoder. One of these is the motion compensation itself, the other is the quantization of block-based integer discrete cosine transform (DCT) coefficients.

In order to improve the Rate Distortion, RD, performance of the H.264/AVC codec, the remaining coding noise is reduced in the reconstructed frames at encoder and decoder. Since these reconstructed frames are successively used for prediction of future frames, every degree of noise reduction will increase the performance of the codec. The applied strategy involves identification and tracking of identical image content over the past coded and noisy frames. For each pixel in frame $F_1$ an individual motion trajectory is constructed that identifies N pixel amplitudes in the past N frames. It is assumed that image content in the pixels identified along the motion trajectory does not change and that any deviation of these pixel amplitudes is caused by additive independent (white) coding noise. Statistical signal theory implies that averaging the N pixel amplitudes along the trajectory potentially reduces the noise variance by a factor of N, resulting in a coding gain.

Hereinafter, $Y_i(x, y)$, $U_i(x, y)$ and $V_i(x, y)$ shall denote the luminance and chrominance components of the i-th frame of a video sequence at pixel position $(x, y)^T$ respectively. Since in H.264/AVC motion vectors are assigned not to individual pixels but rather to blocks of various sizes, all pixels within such a block are assumed to have identical motion, resulting in a field of motion vectors with components $dx_i(x, y)$ and $dy_i(x, y)$. These give the motion vector needed to retrieve the pixel $(x, y)^T$ in frame $F_i$ from its respective reference frame.

Hereinafter, in an exemplary fashion, the H.264 baseline profile with an IPPP-structure (I=Intra-mode, P=Predictive-mode) is considered, thus there exists always only one reference frame, which is the previously encoded frame Fi-1. Starting with frame Fi currently to be encoded, the trajectory is retrieved for a pixel (x0, y0)T inside that frame.

The first luminance and chrominance components along the trajectory $Y^t_0$, $U^t_0$ and $V^t_0$ are identical to the current image values $Y_i(x_0, y_0)$, $U_i(x_0, y_0)$ and $V_i(x_0, y_0)$. The location occupied by the pixel $(x_0, y_0)^T$ in the previous frame can be calculated by adding the motion vector associated with $(x_0, y_0)^T$ to that location as given in $$\begin{pmatrix} x_1 \\ y_1 \end{pmatrix} = \begin{pmatrix} x_0 \\ y_0 \end{pmatrix} + \begin{pmatrix} dx_i(x_0, y_0) \\ dy_i(x_0, y_0) \end{pmatrix}. \quad (1)$$

Since $(x_1, y_1)^T$ generally points not to an integer pixel position but rather has quarterpel resolution, a rounding operation is helpful to retrieve the motion vector from the next motion vector field. The resulting pixel location in frame $F_{i-2}$ is subsequently given by $$\begin{pmatrix} x_2 \\ y_2 \end{pmatrix} = \begin{pmatrix} x_1 \\ y_1 \end{pmatrix} + \begin{pmatrix} dx_{i-1}(\lfloor x_1 \rfloor, \lfloor y_1 \rfloor) \\ dy_{i-1}(\lfloor x_1 \rfloor, \lfloor y_1 \rfloor) \end{pmatrix}. \quad (2)$$

The associated luma component is $Y^t2=Y_{i-2}(x_2, y_2)$.

Thus it is possible to formulate a general recursive formula for determining the j-th position of a pixel from frame $F_i$ along the trajectory for any given frame $F_j$ as notated in equation 3:

$$\begin{pmatrix} x_j \\ y_j \end{pmatrix} = \begin{pmatrix} x_{j-1} \\ y_{j-1} \end{pmatrix} + \begin{pmatrix} dx_{i-j}(\lfloor x_{j-1} \rfloor, \lfloor y_{j-1} \rfloor) \\ dy_{i-j}(\lfloor x_{j-1} \rfloor, \lfloor y_{j-1} \rfloor) \end{pmatrix}. \quad (3)$$

Equivalently the trajectory's j-th luminance sample is $Y^t_j=Y_{i-j}(x_j, y_j)$, the same holds for both U- and V-channels, too.

The averaging along the pixel trajectory as described above can be integrated into the H.264 encoder depicted in FIG. 1.

Firstly, all predicted frames that have not yet been deblocked are stored in a separate queue. Additionally, all motion vectors that have been used to predict these frames are also stored. In order to minimize memory usage only eight past frames and motion vector fields are kept. The new inloop filter is inserted in the encoder in front of the deblocking filter, which filters according to remaining block edges and does not reverse TTF-induced improvements. For every pixel inside a frame to be deblocked a trajectory is calculated as described above.

The luma components, that have to be obtained with quarterpel accuracy according to equation 3, may be calculated using the standard H.264 interpolation filter. For the chroma components an eighthpel interpolation is used equivalently. This results in the formation of a list of luminance values $Y^t_0, \ldots, Y^t_7$ and two lists of chrominance values for every pixel in the current frame.

Before applying an averaging operation along the trajectory the validity of the predicted trajectory has to be verified. Here two indicators for a badly predicted trajectory are used.

A sudden change of the luminance value $\Delta Y_j=|Y^t_{j+1}-Y^t_j|$ can indicate that a retrieved motion vector no longer correctly describes a pixel's trajectory. (This is for instance the case when foreground objects are partly inside a background block thus interrupting the trajectory.) In order to avoid the inclusion of wrong luminance values the trajectory is only continued if $\Delta Y_j \leq T_Y$ for a given threshold $T_Y$. The derivation of an optimal $T_Y$ per frame will be described in further detail below.

Another indicator for a badly predicted trajectory are strong variations in the motion vector field. During the retrieval of the motion vector for a specified pixel as given in equation 3, the retrieved motion vector may be compared against the vectors for the eight neighboring 4×4 blocks as illustrated by FIG. 2.

The block vote metric $BV_j(x_j, y_j)$ denotes the number of 4×4 blocks surrounding location $(x_j, y_j)^T$ whose motion vectors differ from the one in which $(x_j, y_j)^T$ lies.

Figure 2:
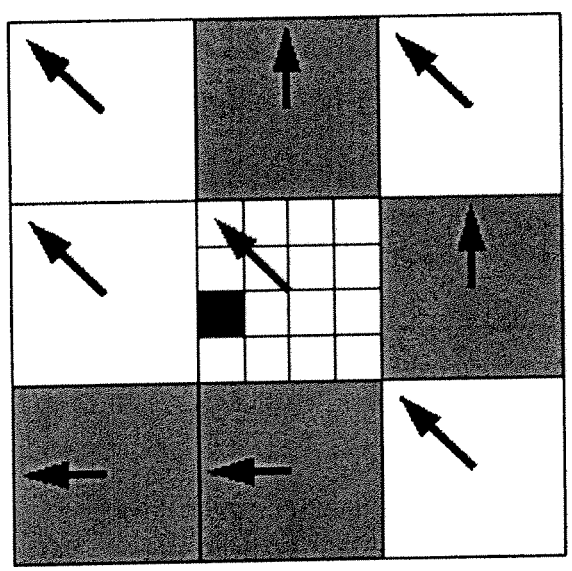
FIG. 2 shows an exemplary embodiment of a BV (block vote) metric that gives the number of 4×4 blocks surrounding the trajectory's current location, whose motion differs from the block through which the trajectory passes, wherein the location of the trajectory is marked in black and wherein all surrounding blocks with a different motion are grayed out.

In FIG. 2 the $BV_j(x_j, y_j)$ value is 4. Based on this metric a second threshold $T_{BV}$ can be used to control the length of the predicted trajectory based on the confidence in the motion vector accuracy as given in $$BV_j(x_j, y_j) \leq 8 - T_{BV} \quad (4)$$

The BV metric effectively checks for every pixel along the trajectory if a number of surrounding 4×4 blocks has identical motion to the current trajectory's motion. As an example $T_{BV}=0$ would not restrict the motion at all, while $T_{BV}=8$ only continues a trajectory if all surrounding blocks have identical motion. In this context 4×4 blocks lying outside the frame are not considered at all, so that blocks at the edge of the frame are only checked against a smaller number of reference blocks. Intra-coded blocks are assumed to have zero motion.

Figure 3:
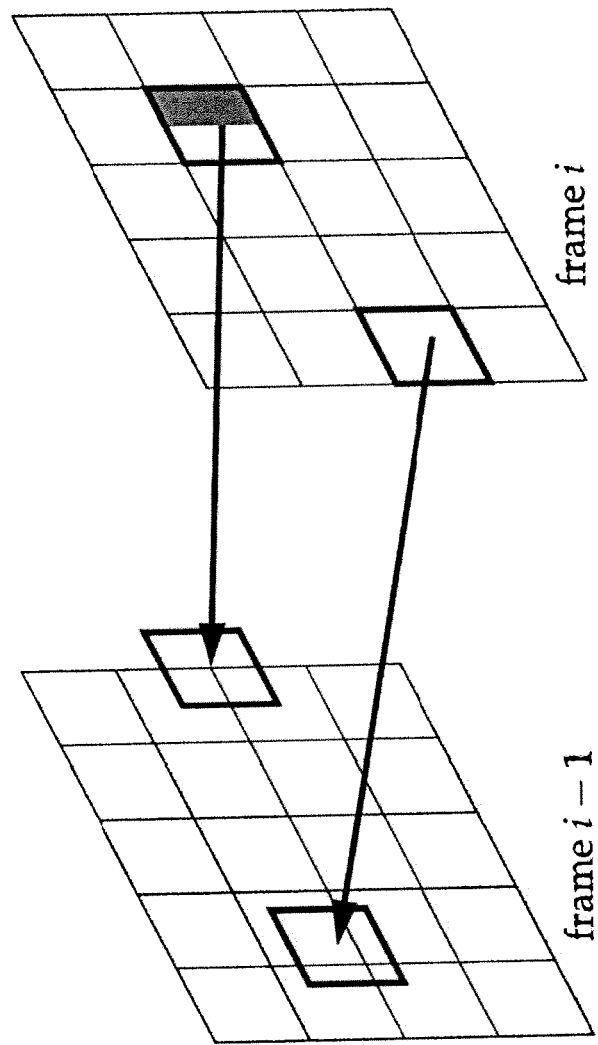
FIG. 3 shows an exemplary case where a block in frame i is predicted from a block that lies partly outside of frame i-1 and a number of pixels has no valid trajectory, all pixels, whose trajectories are interrupted in frame i, being marked in gray.

There are two further cases in which a trajectory may be interrupted: The first being intra-coded blocks. Should a trajectory reach such a block, which has no associated motion vector, it is terminated. The second case occurs when the predicted block retrieved from the previous frame lies partly outside the frame as shown in FIG. 3. In this case no motion information is available for a number of pixels whose trajectory is also interrupted.

Both thresholds introduced above may now be optimized for each frame. For all possible combinations of $1 \leq T_Y \leq 8$ and $0 \leq T_{BV} < 4$ the trajectories for each pixel in the frame to be deblocked are calculated and the luma and chroma components of every pixel are then replaced by the average along its respective trajectory of length $K \leq 8$ as given by $$Y_{opt} = \frac{1}{K} \sum_{j=0}^{K-1} Y_j^t \qquad (5)$$

$$U_{opt} = \frac{1}{K} \sum_{j=0}^{K-1} U_j^t$$

$$V_{opt} = \frac{1}{K} \sum_{j=0}^{K-1} V_j^t.$$

The current implementation only applies the filter to the luma component, leaving both chroma components in their original state. Each combination can now be assigned a mean squared error (MSE) compared to the original frame to be encoded.

The optimum thresholds yielding the minimum MSE are then chosen and encoded in the bitstream requiring five additional bits per frame. Instead of computing all 32 different versions of the filtered frame it is easily possible to calculate all MSEs simultaneously only having to process every pixel in the current frame once. The first advantage of this approach is that no additional side information is required on the macroblock level. Secondly, every pixel is filtered with an individual filter length which helps to break up blocking artifacts.

Figure 4:
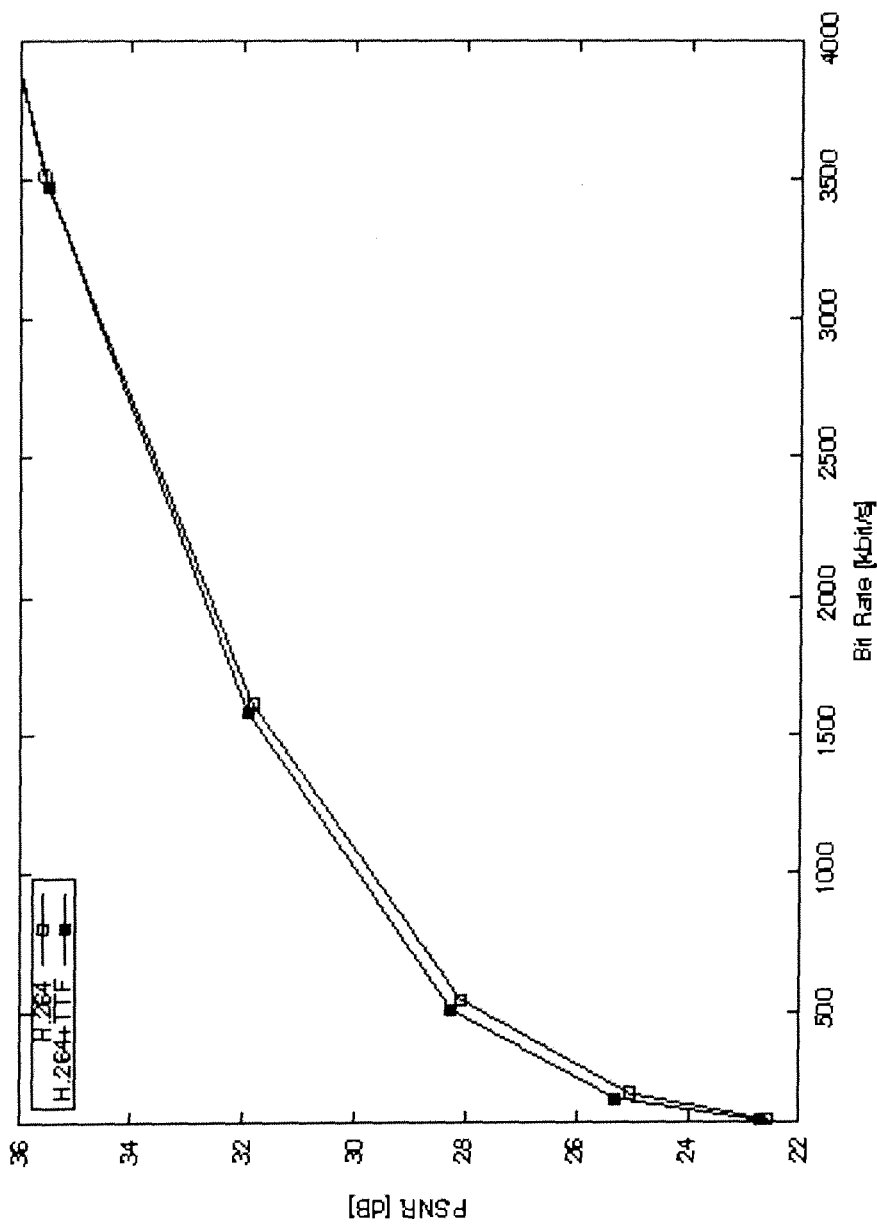
FIG. 4 shows, in an exemplary fashion, peak signal-to-noise ratio, PSNR, vs. bit rate for a BQSquare sequence, 416×240, 60 Hz, 600 frames (Quantization Parameter, QP, from 25 to 45)

The proposed filter has been implemented in C and integrated into the JM 11 (KTA 2.2) software using the H.264/AVC baseline profile. The resulting bit rates and peak signal-to-noise ratio (PSNR) values are compared against the same software without the additional inloop filter, which behaves exactly as H.264/AVC. The implementation has been tested on a large variety of sequences including five sequences in TV resolution and 15 MPEG test sequences. Exemplary RD-curves for the BQSquare sequence are shown in FIG. 4. From the underlying data it becomes instantly apparent, that the filter is less effective for high Quantization Parameter, QP. This is due to the fact that at very low quality reference blocks themselves are of such poor quality that averaging along the trajectory cannot significantly improve the current frame. In the final implementation the filter was therefore switched off automatically for QP higher than 45.

For all sequences average PSNR gain and bit rate reduction were measured using the Bjøntegaard metric [7]. The average values are given in the tables shown in FIGS. 6 and 7.

These values show, that the filter performs well for sequences of resolutions ranging from 416×240 (BQSquare) to 2560×1600 (Traffic). Additionally, the actual frame rate also seems to have no significant impact on the resulting quality, as significant bit rate reduction is present both for sequences with 24 Hz (ParkScene) and with 60 Hz frame rates (BQTerrace).

Figure 5:
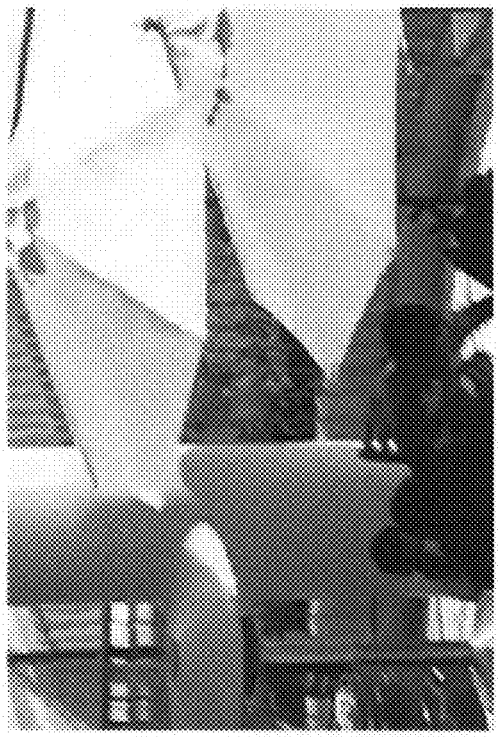
FIG. 5 shows, in an exemplary fashion, a segment from frame 160 of the BQTerrace sequence, left: H.264/AVC at 3.596 MBit/s (31.14 dB), right: H.264/AVC+TTF at 3.203 MBit/s (31.32 dB), especially in the fence more detail is present in the TTF filtered version.
Figure 5:
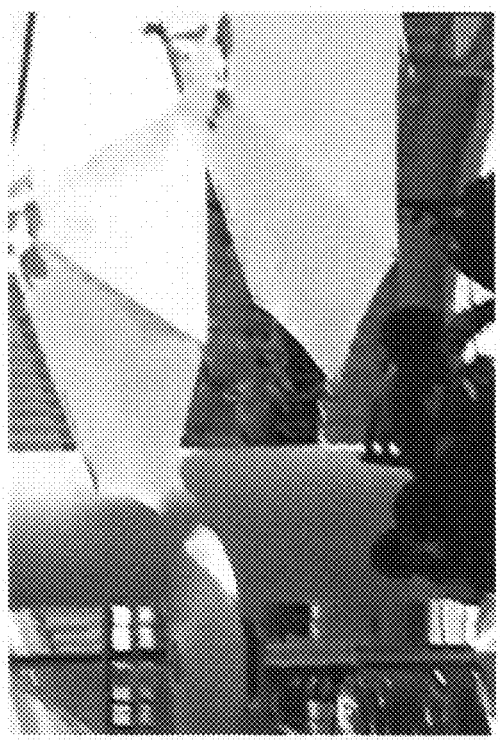

Since the filter makes a pixel-wise decision concerning the filter length, the visual quality of the decoded bit stream is also improved as is illustrated by the segments from the BQTerrace sequence shown in FIG. 5. The performance gain illustrated in FIG. 5, however, still does not explore the full potential of the proposed filter. The MSE minimization is, for instance, not necessarily the best criterion for determining the transmitted thresholds. Ideally, an RD-optimization scheme should be adopted to derive both $T_Y$ and $T_{BV}$ for each frame. This is especially important since there is no linear dependency between the transmitted error residual and the amount of bits needed to encode it. Equivalently, maximizing the MSE of any reference picture does not result in a minimization of the total bit rate for the entire video sequence. Nevertheless, the proposed algorithm has shown to improve the compression efficiency of the H.264/AVC baseline profile for all tested sequences fully justifying the introduced overhead of five bits per frame.

In summary, the present invention provides a new inloop filtering approach that uses temporal information in the form of pixel trajectories to improve the quality of reference pictures used in H.264/AVC. The algorithm based on individual temporal pixel trajectories as described provides bit rate savings for all tested sequences, reducing the bit rate by more than 4% on average. This is achieved without significantly increasing computational complexity or memory usage of the encoder. Moreover, even better results could be achieved by adopting an RD-optimization scheme.

REFERENCES

[1] P. List, A. Joch, J. Lainema, G. Bjøntegaard, and M. Karczewicz, "Adaptive deblocking filter," IEEE Transactions on Circuits and Systems for Video Technology (TCSVT), 2003.
[2] E. Dubois and S. Sabri, "Noise reduction in image sequences using motion-compensated temporal filtering," IEEE Transactions on Communications, vol. 32, no. 7, pp. 826-831, Jul. 1984.
[3] J.-R. Ohm, "Three-dimensional subband coding with motion compensation," IEEE Transactions on Image Processing, Sep. 1994.
[4] X. Wang, M. Karczewicz, J. Ridge, and Y. Bao, "Simplified update step of motion compensated temporal filtering for video coding," in Proceedings of the 24th Picture Coding Symposium, 2006, pp. 826-831.
[5] D. T. Vo and T. Q. Nguyen, "Optimal motion compensated spatio-temporal filter for quality enhancement of H.264/AVC compressed video sequences," in Proceedings of the 16th International Conference on Image Processing (ICIP), Nov. 2009, pp. 3173-3176.
[6] A. Glantz, A. Krutz, M. Haller, and T. Sikora, "Video coding using global motion temporal filtering," in ICIP, Nov. 2009, pp. 1053-1056.
[7] G. Bjøntegaard, "Calculation of average PSNR differences between RD-curves," ITU-T SG16/Q.6 VCEG document VCEG-M33, Mar. 2001.

The invention claimed is:

1. A method for processing the pixel amplitude of at least one image pixel contained in a current frame of a video sequence, said method comprising the steps of constructing an individual motion trajectory comprising motion-shifted versions of the at least one image pixel over a plurality of neighboring frames, and filtering the pixel amplitude with an individual filter length based on the individual motion trajectory that results from a pixel-wise decision concerning the filter length, wherein said step of constructing said individual motion trajectory comprises the steps of:
choosing the at least one image pixel of the current frame as a start pixel of the individual motion trajectory, and adding motion-shifted versions of the at least one image pixel of preceding and/or subsequent frames to the individual motion trajectory;
wherein for each motion-shifted version to be added, it is determined whether a difference value, which indicates the change of the pixel amplitude of the respective motion-shifted version between consecutive frames, is smaller than an amplitude threshold value, which is individually assigned to the current frame or a frame portion of the current frame comprising said at least one image pixel, and wherein said step of adding further motion-shifted versions is stopped if said difference value exceeds said amplitude threshold value, and wherein said amplitude threshold value is allocated to the current frame by carrying out the following steps:

a) defining an amplitude threshold value range comprising a plurality of amplitude threshold values;

(b) processing the pixel amplitudes of a plurality of pixels contained in the current frame based on a given amplitude threshold value of said amplitude threshold value range, and generating a processed frame;

(c) comparing the processed frame with a reference frame and determining an image difference value;

d) repeating steps (b) and (c) for each amplitude threshold value of said amplitude threshold value range and determining the respective image difference value;

(e) determining the amplitude threshold value providing the smallest image difference value; and (f) allocating the determined amplitude threshold value to the current frame.

2. The method of claim 1 wherein the step of adding a motion-shifted version to the individual motion trajectory includes:

determining the pixel amplitude of said motion-shifted version;

determining the pixel amplitude of the motion-shifted version in the next preceding and/or subsequent frame;

determining a difference value, which indicates the difference between the pixel amplitude of said motion-shifted version and the pixel amplitude of said motion-shifted version in the next preceding and/or subsequent frame;

comparing said difference value with said amplitude threshold value, if the difference value is smaller than said amplitude threshold value, elongating the individual motion trajectory by adding the motion-shifted version to the individual motion trajectory, and if the difference value exceeds said amplitude threshold value, completing the construction of the individual motion trajectory.

3. The method of claim 1 wherein the at least one image pixel and the motion-shifted versions thereof belong to a pixel block, said pixel block comprising a plurality of pixels belonging to the same frame section.

4. The method of claim 1, wherein said amplitude threshold value range ranges to at most 5% of the maximum intensity value that can be assigned to pixel amplitudes.

5. The method of claim 1, wherein a bit stream is generated, the bits of said stream describing the frames of the video sequence and the amplitude threshold value for each of said frames.

6. The method of claim 1 wherein the frames of the video sequence comprise pixel blocks, each pixel block comprising a plurality of pixels belonging to the same frame section;

wherein the video sequence comprises a flag for each block, said flag indicating whether or not the amplitude threshold value of the frame is allocated to the pixels of the respective pixel block; and wherein for pixels of blocks, to which no amplitude threshold value is allocated, the construction of trajectories is skipped.

7. The method of claim 1 comprising the steps of:

(a) defining an amplitude threshold value range comprising a plurality of amplitude threshold values, and a block threshold value range comprising a plurality of block threshold values;

(b) processing the pixel amplitudes of a plurality of pixels contained in the current frame based on a given amplitude threshold value of said amplitude threshold value range and a given block threshold value of said block threshold value range, and generating a processed frame;

(c) comparing the processed frame with a reference frame and determining an image difference value;

(d) repeating steps (b) and (c) for each amplitude threshold value of said threshold value range and each block threshold value of said block threshold value range, and determining the respective image difference value;

(e) determining the combination of amplitude threshold value and block threshold value providing the smallest image difference value; and (f) allocating the determined amplitude threshold value and the determined block threshold value to the current frame.

8. The method of claim 1 wherein the frames of the video sequence comprise pixel blocks, each pixel block comprising a plurality of pixels belonging to the same frame section;

wherein said video sequence comprises a flag for each block, said flag indicating whether or not the amplitude threshold value of the frame and the block threshold value of the frame are allocated to the pixels of the respective pixel block; and wherein for pixels of blocks, to which no amplitude threshold value and no block threshold value is allocated, the construction of trajectories is skipped.

9. The method of claim 1 wherein said step of processing the pixel amplitude based on the individual motion trajectory comprises the step of combining the pixel amplitudes of the motion-shifted versions of said image pixel along the individual motion trajectory using a weighting function, to form a processed pixel amplitude of said image pixel.

10. The method according to claim 1 wherein frames of said video sequence are filtered and/or predicted by incorporating said processed pixel amplitude of said image pixel into the video sequence.

11. The method according to claim 1 wherein further video sequences having spatially adjacent frames that comprise image pixels corresponding to those of said video sequences, are taken into account to form said processed pixel amplitude of said image pixel.

12. Device capable of carrying out the method according to claim 1.

13. The method of claim 3 comprising the steps of:

for each motion-shifted version to be added, determining the number of pixel blocks, which are adjacent to said pixel block and have similar or identical motion vectors, comparing said number of pixel blocks with a block threshold value; and stopping said step of adding further motion-shifted versions to the individual motion trajectory if said number of pixel blocks is smaller than said block threshold value.

14. The method of claim 7 wherein said amplitude threshold value range ranges to at most 5% of the maximum intensity value that can be assigned to pixel amplitudes; and wherein said block threshold value range ranges to at most 50% of the maximal number of blocks adjacent to a given block.

15. The method of claim 7 wherein a bit stream is generated, the bits of said stream describing the frames of the video sequence, the amplitude threshold value for each of said frames, and the block threshold value for each of said frames.

16. Device of claim 12, wherein the device is an in-loop filter.

17. Device of claim 12, wherein the device is a decoder.

18. Device of claim 12, wherein the device is an encoder.

* * * * *